Sept. 29, 1964   J. C. BOMBERGER   3,150,436
FABRICATION OF SOLID SHEET PACKS
Filed March 19, 1962

INVENTOR
John C. Bomberger.

BY *Mason, Mason & Albright*
ATTORNEYS.

United States Patent Office 3,150,436
Patented Sept. 29, 1964

3,150,436
FABRICATION OF SOLID SHEET PACKS
John C. Bomberger, Coatesville, Pa., assignor to Lukens Steel Company, Coatesville, Pa., a corporation of Pennsylvania
Filed Mar. 19, 1962, Ser. No. 180,560
4 Claims. (Cl. 29—19)

This invention relates to the fabrication of solid sheet packs whereby to produce light gauge plates on plate mills. Two or more of such plates may be welded in stacked relationship about their side edges to form a pack, subjected to heating in a conventional soaking pit or furnace, and then hot rolled to gauge. However, it has been found that the welds of such plates, when subjected to rolling at high temperatures, often are broken, resulting in a damaged final product. One of the reasons for failure is because the flat mating surfaces of the plates are not entirely flat or planar. Very often such plates have irregular flat surfaces and the action of rolling to gauge causes one plate to slightly rock on the other plate, resulting in injury to the weld during rolling. Preferably, the adjacent side edges of the plates are beveled. Irregularities or unevenness very often develops in the beveling operation resulting in gaps at the edges, which increases the difficulties of properly welding the plate side edges to each other.

An object of the invention is to provide a re-enforcement for the welds in the pack rolling of packs.

Another object is to provide an air gap between the parting compound and the welds.

A further object is to provide a ledge to run in the weld material during the welding steps.

Yet another object is to provide a ledge that will compensate for the unevenly beveled side edges of the plates.

An additional object is to provide a process of rolling thin sheets of steel or other metals, or their alloys, particularly high strength steels, whereby to produce very light gauge sheets for use in the solid fuel missile program and similar missile programs.

A further object is to provide a method which encompasses the use of conventional welding and plate rolling facilities to produce wide alloy sheets and plates for the missile industry.

Other objects will appear hereinafter throughout the specification.

Figure 1:
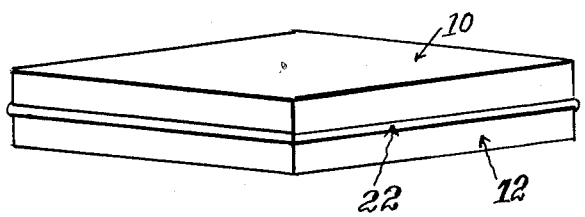
Figure 2:
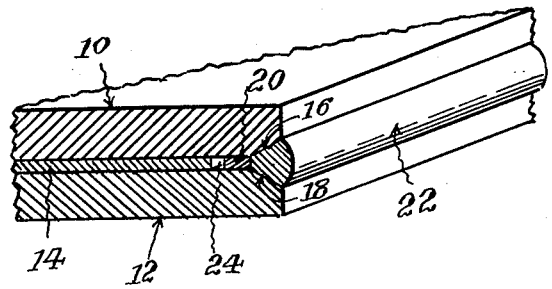
Figure 3:
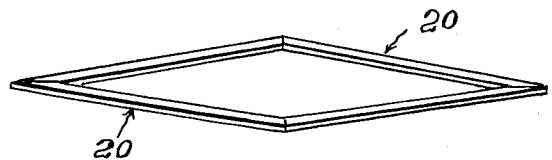

In the drawings:
FIGURE 1 is a typical plate assembly prior to the rolling operation;
FIGURE 2 is an enlarged vertical sectional view, partly broken away of the assembly shown in FIGURE 1; and
FIGURE 3 shows the strips in assembled position.

In the drawings, 10 and 12 are slabs or plates which are separated from each other by a parting compound 14 of conventional kind.

All four edges of the slabs 10 and 12 are, preferably, provided with beveled edges 16 and 18, respectively, for the reception of the welds 22; the strips 20 extending along the beveled edges 16 and 18.

The slabs are composed of various metals or alloys thereof, steel and its alloys being preferred, especially stainless steel and other high strength steels.

In the drawings, only two plates 10 and 12 are shown, but it will be expressly understood that any suitable number of slabs may be used in the pack, each slab being separated from its next adjacent slab by a parting layer, with the four adjacent edges provided with beveled edges for the metal bonding strips 20 and welds 22.

It will be appreciated that the bonding strips re-enforce the welds particularly during the heating and rolling operations, whereby the plates are rolled to gauge. Additionally, the strips 20, which are located at the roots of the welds, provide an air gap 24 between the adjacent side edges of the plates. The strips also fill the spaces between the beveled side edges of the plates, and compensate for uneven facing plate surfaces that are separated from each other by the parting compound 14.

The metal strips are ordinarily unfused in the instant method of assembly prior to the welding step.

The method includes the following steps, viz.: forming a pack of two or more slabs of metal, preferably of high strength steel, each pair of slabs having an interposed layer of parting compound. It is preferred to provide beveled portions on the adjacent edges of the slabs prior to assembly. During assembling of the slabs in a pack, the strips are inserted along the spaces provided by the beveled portions, and the slabs and strips are welded at the beveled portions so as to fill entirely the spaces formed by the beveled portions. In accordance with usual practice in the art, vents are provided from the interior of the pack to the atmosphere so that gases therein may escape during the rolling operation.

It will be understood that solid rods or tubes of substantially circular cross-section, as well as extruded shapes and angled sections, may be substituted for the strips shown in the drawings.

After the welding operation, the pack is heated and rolled to gauge. Following rolling to gauge and cooling, the edges of the pack are cut by shears or other means on all four sides to remove the strips and welded portions of the sides.

The plates could vary, by way of example, from a thickness of 3/4 inch to 3 or 4 inches, 1 3/4 inches being a typical gauge.

The final product includes heads, plates identified in the end product as "solid fuel containers," "building blocks," "thrust chambers," "boosters," "solid fuel engines," "motor casings," etc. The material identification may be defined as A.G.C. 34152, D6AC, H–11, A.I.S.I. 4300 Series, A.I.S.I. 4100 Series, 300 M U.S.S. X 200, Inco 25° Ni., or any other specifying minimum yields of 150,000 p.s.i. and above.

One use of metal bonding strips in the present method is to provide a useful base for the root pass weld being applied to the joint, and to provide a metallic base to take the place of the heretofore used mineral base, such as Fiberfraxor Kaowool.

In such cases where no base for the welding material has been provided at all, as in the prior art, the commercial variation from ideal flatness may make the weld root gap so wide as to be difficult to close by welding.

The provision of a metal base, as provided by the strip method of this invention, avoids contamination of the interior of the weld by weld metal splatter, or by welding flux, such as when using the submerged arc process.

It has been determined that the use of metal bonding strips in a pack rolling process of this invention, provides an essential means for increasing the reliability of the welded joint, especially during subsequent rolling of the pack.

The material of which the strips, rods, etc., may be composed may be of soft metal or a metal suitable for the heating and rolling process. Such materials may or may not be the same as the metal slabs 10 or 12. A typical strip may have a width of 1 1/2 inches and be 1/8 inch thick. Rods or tubes when used in place of the strips may vary from a diameter of about 1 1/2 inches to 1/2 inch.

The present method which utilizes metal bonding strips to supplement welding of solid slabs or plates is an improvement over the prior art in the production of light gauge plates or sheets, which can be produced at low cost on conventional plate mill facilities. The method is particularly attractive in the production of small lots of sheets such as are used in the missile industry.

It will be understood that the plates which have been selected are of suitable grade and dimensions and are first thoroughly cleaned, especially on their confronting surfaces before applying the parting compound to the cleaned surfaces. A clean area, approximately two inches wide, is left adjacent the edges for placement of the bonding strips, rods or tubing which are also cleaned. These bonding strips, such as cleaned low carbon steel strips of, say, number 10 gauge, 1½ inches wide and about ⅛ inch thick are placed along the edges as shown at 20 in the drawings and between the two plates. If more than two plates are used, the strips are placed between each adjacent pair of confronting faces of the plates.

The resulting pack is then assembled, welded, heated and rolled in the conventional manner.

The following advantages are obtained by the process of this invention.

(1) Pack breakage is eliminated, which results in a high product yield.

(2) A stronger weld joint is produced.

(3) A bonded zone is formed during rolling.

(4) Conventional welding and plate rolling facilities can be used to produce wide alloy sheets and plates of small gauge for the missile and other industries.

The term strips in the claims is intended to include strips, rods, tubes or angles composed of metal.

The above description and drawings disclose a single embodiment of the invention and specific language has been used in describing the several figures. It will, nevertheless, be understood that no limitations of the invention are thereby contemplated, and that various alterations and modifications may be made, such as would occur to one skilled in the art to which the invention relates.

I claim:

1. A method of forming light gauge steel sheets which comprises the steps of cleaning the mating surfaces of a plurality of slabs or plates, assembling said slabs or plates into a pack, applying a parting compound to at least one of said mating surfaces, placing strips of metal adjacent the side edges of said slabs or plates, welding the side edges and said strips with the strips extending into substantial contact with the confronting faces of said slabs or plates, the said strips being located adjacent to the roots of the welds, and heating and rolling to gauge the pack so formed.

2. A method of forming light gauge steel sheets which comprises the steps of beveling the side edges of a plurality of slabs or plates, applying a parting compound to at least one of the faces of said slabs or plates, assembling said slabs or plates into a pack with the face containing said parting compound in confronting relationship with the face of another of said slabs or plates and the said beveled edges facing each other, placing strips of metal adjacent said beveled edges, welding the said side edges with the strips extending into substantial contact with the confronting faces of said slabs or plates, the said strips being secured to the roots of the welds, and heating and rolling the pack so formed.

3. The method of forming light gauge steel sheets which comprises the steps of beveling the side edges of a plurality of slabs or plates, cleaning the surfaces of said slabs or plates, applying a parting compound to at least one of the faces of one of said slabs or plates to within a distance of about two inches from the side edges thereof, and assembling the same into a pack with the beveled edges of the slabs or plates in confronting relationship and placing strips of metal on the uncoated portions of the face of one of said slabs or sheets in aligned relationship to the said beveled edges, welding the slabs or plates and said strips to each other at said beveled edges with the strips extending into substantial contact with the confronting faces of said slabs or plates, the said strips being located adjacent to the roots of the welds, and heating and rolling the pack so formed.

4. The method of claim 3, wherein said strips are composed of steel.

References Cited in the file of this patent

UNITED STATES PATENTS

| | | |
|---|---|---|
| 2,813,332 | Keay | Nov. 19, 1957 |
| 2,915,815 | Bean et al. | Dec. 8, 1959 |
| 2,985,945 | Nordheim et al. | May 10, 1961 |